United States Patent [19]

Kimura

[11] Patent Number: 4,474,393
[45] Date of Patent: Oct. 2, 1984

[54] LID LOCKING DEVICE

[75] Inventor: Shigeru Kimura, Kamakura, Japan
[73] Assignee: Nifco Inc., Yokohama, Japan
[21] Appl. No.: 343,798
[22] Filed: Jan. 29, 1982
[30] Foreign Application Priority Data
 Jan. 29, 1981 [JP] Japan .................................. 56-10277
[51] Int. Cl.³ .............................................. E05C 13/06
[52] U.S. Cl. ............................ 292/171; 292/DIG. 25;
          292/DIG. 38; 292/DIG. 53
[58] Field of Search ............... 292/163, 171, 175, 337,
          292/DIG. 25, DIG. 38, DIG. 53, 144

[56] References Cited

U.S. PATENT DOCUMENTS 2,598,670 6/1952 Bentley et al. .................. 292/171 X
3,466,075 9/1969 Fernardem et al. ......... 292/DIG. 38
4,258,504 3/1981 Hicks .............................. 292/171 X Primary Examiner—Richard E. Moore
Attorney, Agent, or Firm—J. R. Halvorsen; T. W. Buckman

[57] ABSTRACT

A lid locking device of a simple construction is fastened strongly to a panel by a simple procedure comprising the steps of setting a stopper energized with a spring in a cylindrical case provided with a contact flange formed on the outer peripheral surface of the cylinder surrounding an opening thereof, inserting the cylindrical case into an opening formed in a panel containing an inlet to the gasoline tank in an automobile and bringing the contact flange against the rear side of the panel, and fastening a cap to the flange on the front side of the panel.

1 Claim, 15 Drawing Figures

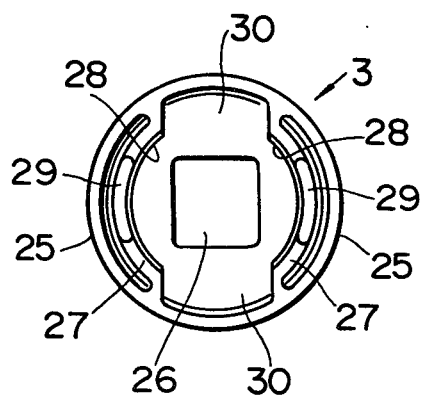
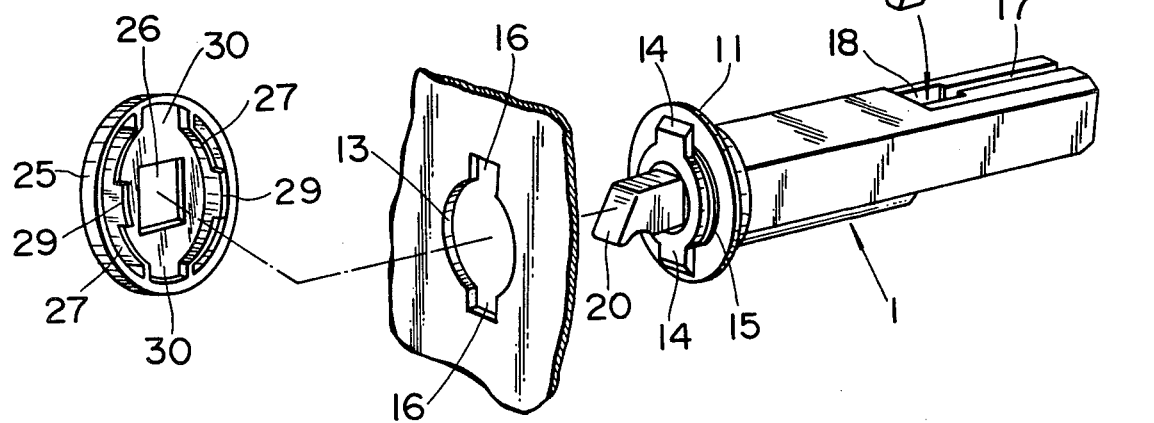

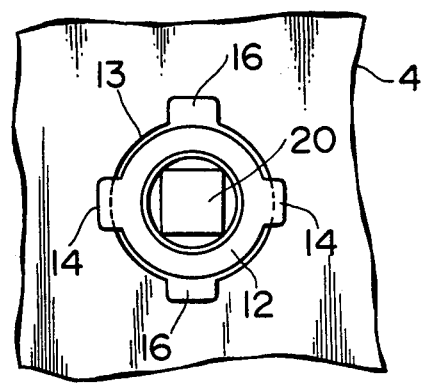
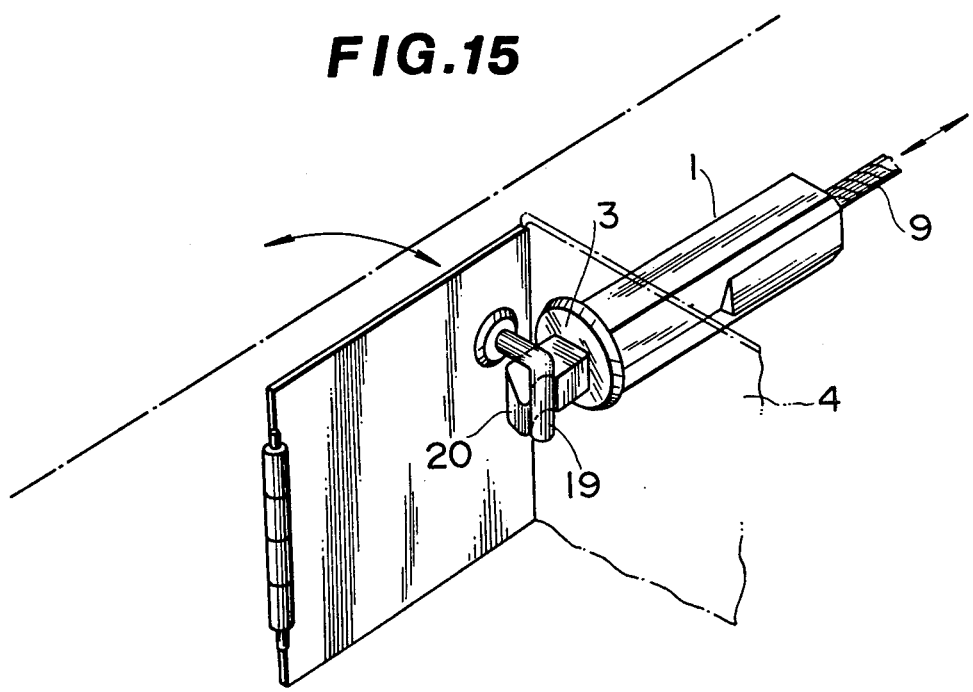

LID LOCKING DEVICE

BACKGROUND OF THE INVENTION

This invention relates to a lid locking device to be used as for locking a hinged lid adapted to close a fuel inlet to a gasoline tank in an automobile.

Generally, the lid hinged at the fuel inlet to the gasoline tank in the automobile is adapted to be opened or closed by an operation performed at a remote place such as a driver's seat. To permit the remote operation, the lid is so constructed that a stopper slidably energized with a spring for fastening or releasing the lid is enclosed with a case which is attached fast to the lateral panel around the fuel inlet. A release wire connected to a release lever in the driver's seat is extended and tied to the rear end of the stopper. The stopper which normally keeps the lid closed on the fuel inlet is released when the driver turns the release lever and gives a pull at the release wire.

The lid locking device of this principle which is now extensively used has a construction wherein a flange is provided at the front end of the case and check members are disposed on the rear side of the flange as separated by a distance approximately equal to the thickness of the panel at the fuel inlet. The attachment of this lid locking device to the panel around the fuel inlet is accomplished by inserting the case in the direction of its rear end into a matched opening bored in the panel, pressing the check members against the case, and bringing the lower surface of the flange into intimate contact with the panel surface.

In such a lid locking device as described above, there is generally provided an elastic packing between the panel and the flange to ensure stable retention of the device on the panel. The packing is not so strong as to withstand prolonged use. At times the locking device entails a disadvantage that the check member will slip off its position on exposure to external impacts such as vibration, for example. The elastic packing offers no sealing effect for the opening edge in the panel. Thus, the opening has a possibility of being gradually corroded from the uncoated opening edge thereof. In the case of a lid locking device involving the mechanism using the release wire tied to the stopper, the stopper requires use of a metal rod and a metal connecting member. As a result, the number of the parts increases, the assemblage of the device becomes complicated, and the cost consequently rises.

SUMMARY OF THE INVENTION

An object of this invention is to provide a lid locking device which is composed of a small number of component parts adapted to be readily fitted to each other and, therefore, is easily assembled and which is readily and securely attached to a panel given as a base for its fast attachment to the automobile.

To accomplish the object described above according to this invention, there is provided a lid locking device which comprises a cylindrical case provided at one end thereof with an opening and on the peripheral edge of the opening with a contact flange; a stopper enclosed with the case as slidably energized with a spring and provided with an engaging head portion protruding from the opening of the case; and a cap fastened to the panel so as to come into fast engagement with the contact flange of the case.

The stopper is provided at the rear end thereof with an insertion member adapted to permit a one-touch attachment of a release wire. The attachment of the lid locking device of this invention is accomplished by a simple work which comprises bringing the contact flange of the case from behind the panel into contact with the opening formed in the panel containing the fuel inlet and mounting the cap to the flange on the front side of the panel. Since the contact flange and the cap tightly nip the panel from the opposite surfaces thereof, the lid locking device can be strongly secured to the panel and can manifest its function stably. The component parts of the device can be formed by injection molding of a plastic material. The number of the component parts is small and the parts themselves are adapted to be fitted readily into each other. Consequently the device can be assembled easily and inexpensively.

The other objects and characteristics of the present invention will become apparent from the further disclosure of the invention to be made hereinafter with reference to the accompanying drawings.

BRIEF EXPLANATION OF THE DRAWINGS

FIG. 12 is a rear view of a cap of the device of this invention.

FIG. 13 is an exploded perspective view illustrating the relation between the panel and the lid locking device of the present invention.

FIG. 14 is an explanatory diagram illustrating the condition in which the case is attached to the panel.

FIG. 15 is a perspective explanatory diagram illustrating the condition in which the device is used.

DESCRIPTION OF THE PREFERRED EMBODIMENT

Figure 1:
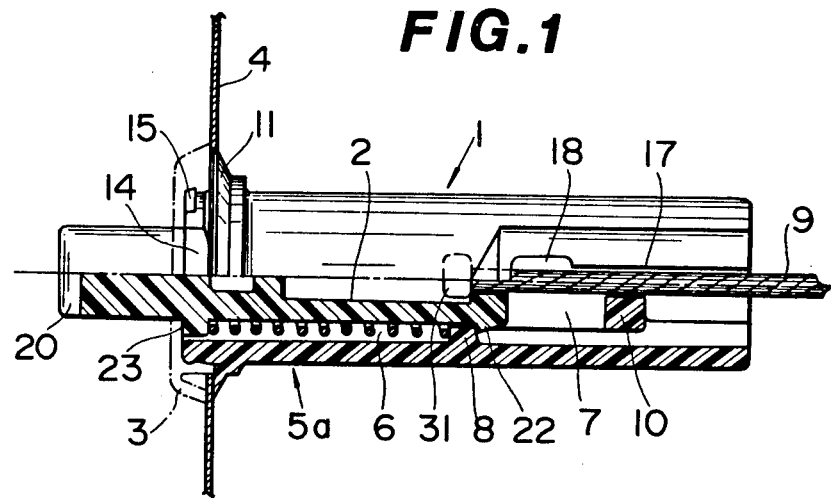
FIG. 1 is a partially omitted plan view of the device of this invention as held in the state of use, with one half portion thereof sectioned to show the interior.
Figure 2:
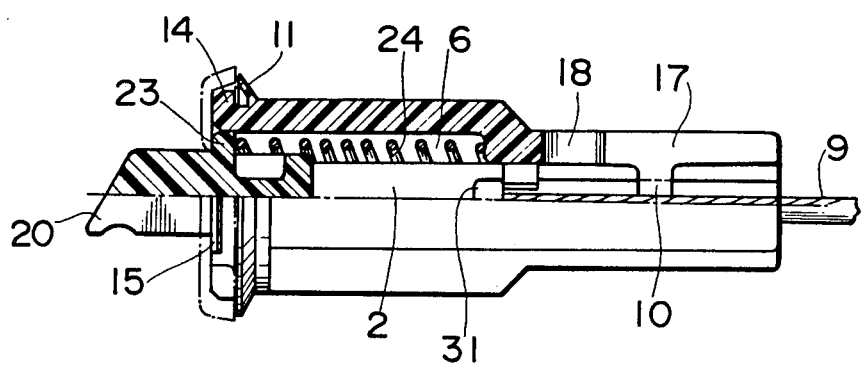
FIG. 2 is a partially omitted front view with one half portion sectioned to show the interior.
Figure 3:
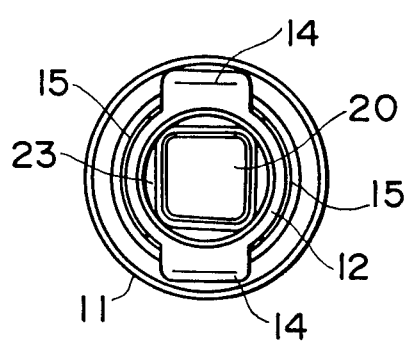
FIG. 3 is a left side view of the device of FIG. 2.
Figure 4:
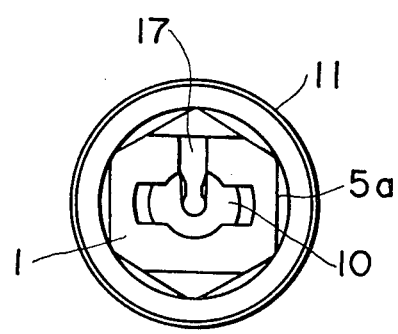
FIG. 4 is a right side view of the device of FIG. 2.
Figure 5:
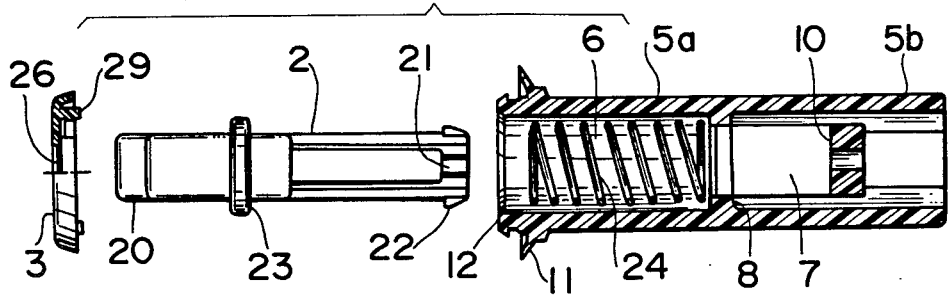
FIG. 5 is a partially sectioned exploded plan view.
Figure 6:
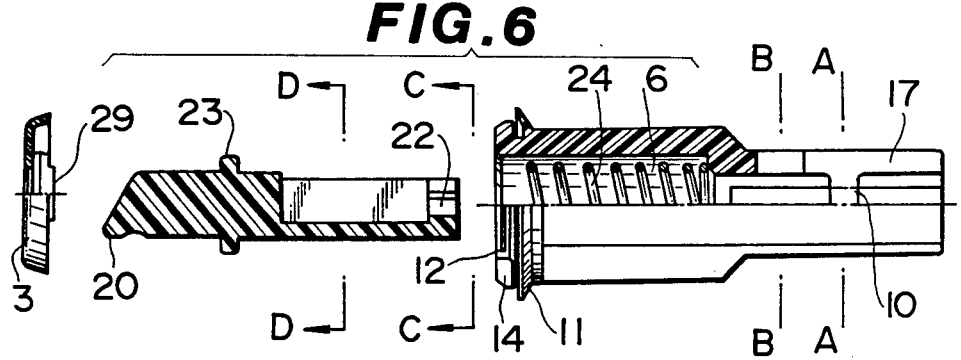
FIG. 6 is a partially sectioned exploded front view.
Figure 7:
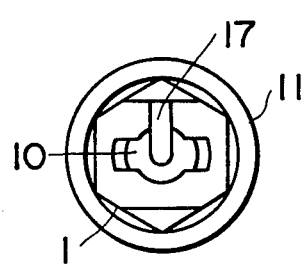
FIG. 7 is a right side view of the device of FIG. 6.
Figure 8:
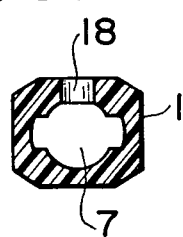
FIG. 8 is a sectioned view taken along the line B—B of the diagram of FIG. 6.
Figure 9:
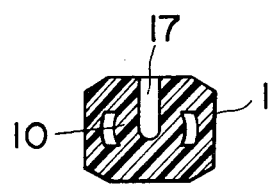
FIG. 9 is a sectioned view taken along the line A—A of the diagram of FIG. 6.
Figures 10, 11:
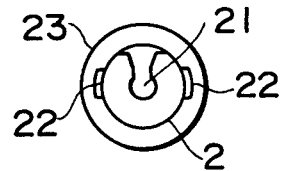
FIG. 10 is an end view along the line C—C of the diagram of FIG. 6.
FIG. 11 is a sectioned view taken along the line D—D of the diagram of FIG. 6.

As illustrated in the drawing, the lid locking device of the present invention is formed of three parts, i.e. a case 1, a stopper 2 embraced within the case 1, and a cap 3 serving to permit fast attachment of the case 1 to a panel 4. All the three parts are made of a plastic material.

The case 1 is wholly formed in a cylindrical shape. In about a half of the entire length of this cylinder, the case 1 has a cross section of the shape of a regular hexagon. By forming in the portion 5a of the cylinder having the cross section of the shape of a regular hexagon a hollow interior whose inner wall surface has a cross section of the shape of a true circle, there is formed a receiving room 6 for the stopper 2. Along the boundary between this receiving room 6 and the hollow interior 7 of the other portion 5b of the cylinder, stepped portions 8 are raised from the inner wall surface. The hollow interior of the case, therefore, is divided by the stepped portions 8 into the receiving room 6 and the hollow interior 7 in a mutually communicating manner. Nearly in the middle of the length of the hollow interior 7, there is provided a forked stationary base 10 adapted to permit fast attachment of a release wire 9 as described more fully afterward. Along the periphery of the opening at one end of the case, namely the opening of the receiving room 6, there is formed an outwardly diverging contact flange 11. Further from the terminal face of the case surrounding the opening, a cylindrical insertion member 12 is raised in the axial direction.

The insertion member 12 is intended for insertion into a perforation 13 to be formed in advance in a given panel 4. On the outer peripheral surface of this insertion member, one pair of engaging members 14 opposed to each other are formed as projected in mutually departing directions at a distance equalling the thickness of the panel from the contact flange 11. Further on the outer peripheral surface of the leading end of this insertion member 12, engaging projections 15 adapted to take hold of the cap are formed in a manner such as to avoid overlapping the engaging members 14.

The perforation 13 to be formed in the panel 4 has the shape of a true circle conforming to the outside diameter of the insertion member 12. Along the edge of the perforation 13 are formed a pair of notches 16 for permitting passage of the engaging members 14 past the panel.

In the other half portion 5b of the case, a slit 17 is formed inwardly from the rear end in the longitudinal direction on the upper side of the cylinder. At the innermost position of this slit 17, there is formed an enlarged portion 18. The slit 17 and the enlarged portion 18 jointly serve as an entrance for the release wire 9 to be connected to the stopper 2. The enlarged portion 18 is located so as to open midway between the stepped portions 8 serving to divide the interior of the case and the stationary base 10 provided in the half hollow interior 7.

The stopper 2 is formed in the shape of a rod. The stopper 2 is provided at one terminal thereof with an engaging head portion 20 adapted to catch hold of a hook 19 formed on the hinged lid. At the other terminal, i.e. the rear end thereof, the stopper 2 is provided with not only a forked connection member 21 adapted to permit connection of the terminal part of the release wire 9 but also engaging projections 22 adapted to come into engagement with the stepped portions 8 formed on the interior of the case. On the outer peripheral surface of the stopper 2, a flange 23 is formed so as to separate the engaging head portion 20 from the rest of the stopper 2.

The entire length of the stopper 2 inclusively of the engaging head portion 20 is equalized with the length of the case from the opening to the stationary base 10 provided within the hollow interior. The thickness of the stopper 2 is smaller than the inside diameter of the hollow interior of the case so that a gap may occur between the stopper 2 and the case 1 when the stopper is inserted into the case. Further, the flange 23 to be formed on the outer peripheral surface of the stopper is formed in the shape of a disc slightly smaller than the inside diameter of the receiving room 6, so that the stopper 2 may be wholly inserted into the case 1.

In the drawing, 24 denotes a spring which serves to energize the stopper 2 to be inserted into the receiving room 6 of the case. This spring 24 is admitted into the receiving room 6 of the case 1 at the same time that the stopper 2 is inserted into the case 1.

Relative to the case 1 constructed as described above, the stopper 2 is poised with its rear end facing the opening of the case and, in this posture, inserted into the receiving room 6. After the engaging projections 22 formed at the rear end thereof have collided with the stepped portions 8, the stopper 2 is forcibly driven in against the resistance offered by the stepped portions and the engaging projections 22 are consequently allowed to force their way by bending the stepped portions outwardly until they plunge into the hollow interior 7 of the case and snap into engagement with the rear sides of the stepped portions 8 to be incorporated fast in the case 1. In this case, the spring 24 serving to energize the stopper 2 is either built in the receiving room 6 in advance or fitted on the outer peripheral surface of the stopper, so that in consequence of the insertion of the stopper into the case, the spring 24 will be set in position within the gap to be formed between the stopper and the inner wall of the receiving room 6. Since one end of the spring 24 is held against the front surfaces of the stepped portions 8 and the other end is stopped by the flange 23 of the stopper 2, the pressure applied to bring the engaging projections 22 into engagement with the stepped portions 8 compresses the spring 24 and causes it to energize the stopper 2 held inside the case 1 in the direction of the opening of the case 1.

By the energizing force of the spring 24, therefore, the stopper 2 contained in the case 1 at all times keeps the engaging projections 22 at the rear portion in engagement with the stepped portions 8 and retains the engaging head portion 20 at the other end in a state protruding from the opening of the case 1. When the engaging head portion 20 is depressed against the energizing force of the spring, it moves backward in the direction of the hollow interior 7. Thus, the engaging head portion 20 can be buried in the case 1.

In the lid locking device of the present invention, the case 1 and the stopper 2 described above may be formed independently of each other as well as the cap 3 to be described more fully afterward and these component parts may be fitted to each other by following the procedure described above at the time that the locking device is fastened to the panel 4. From the standpoint of rapidity of the work of attachment and ease of the management of component parts, it is more advantageous to have the case and the stopper combined into one piece by the procedure described above in advance of the work of attachment to the panel.

Now, the work involved in attaching to the panel the case in which the stopper has been incorporated as described above will be explained. In preparation for this work, the perforation 13 containing the notches 16 in the manner described previously is formed in the panel 4. To this perforation 13, the insertion member 12 which is formed around the opening of the case 1 is opposed from one side of the panel as illustrated in FIG. 13. Then, the engaging portions 14 are placed so as to correspond to the notches 16 and driven into the notches. Consequently, the engaging portions 14 emerge from the other side of the panel 4 and, at the same time, the outwardly diverged contact flange 11 formed on the outer peripheral surface of the cylinder surrounding the opening comes into intimate contact with the panel. After that, the case 1 is rotated around its axis in order for the engaging portions 14 to slide from the notches 16 into the adjacent edges of the perforation 13. Consequently, the engaging portions 14 and the contact flange 11 already held in contact with the other side of the panel cooperate to nip the panel from the opposite sides and set the panel firmly in position. In this case, the contact flange 11 is forcibly pressed against the panel so that the diverged edge thereof may be further diverged to enhance the stability of the attachment of the case. Besides, the increased divergence of the contact flange ensures perfection of the concealment of the perforation 13.

The cap 3 is intended to fix to the panel 4 the case 1 which has been attached thereto as described above. As illustrated in FIGS. 12 and 13, skirts 25 are extended along the periphery of the main body of the cap so that the cap assumes the appearance of a circular saucer. At the center of the main body of the cap, a window 26 for permitting insertion of the engaging head portion 20 of the stopper 2 is formed. Arcuate walls 27 are raised so as to enclose the lateral sides of the window. Along the inner wall surfaces of the arcuate walls, projections 28 are formed. Further, protuberances 29 are raised from the centers of the arcuate walls.

The cap 3 is formed in a size large enough to cover and embrace the insertion member 12 of the case 1. At the same time, the two walls 27 raised on the rear side of the cap 3 are formed in a size such that the inner wall surfaces thereof on which the projections 28 are formed conform to the outer peripheral surface of the insertion member 12 and the protuberances 29 rising from the walls are amply thrust into the notches 16 of the perforation 13.

The cap 3 constructed as described above is placed so as to cover the insertion member 12 of the case 1, with the walls 27 on the rear side thereof fitted around the periphery of the insertion member 12. Then, the projections 28 formed on the inner wall surfaces of the walls 27 are brought into fast engagement with the engaging projections 15 formed on the outer peripheral surface of the insertion member 12. For this attachment of the cap, it is only natural that the engaging head portion 20 of the stopper thrust past the insertion member 12 should be passed through the window 26 in advance of the attachment. It is likewise necessary that the empty spaces formed between the opposed terminal edges of the two walls 27 should cover the engaging portions 14 of the insertion member so that when the projections 28 come into fast engagement with the engaging projections 15, the engaging portions 14 will fit into the empty spaces 30 and the protuberances 29 rising from the walls 27 will plunge into the respective notches 16 of the perforation 13.

As illustrated in FIG. 13, the notches 16 of the perforation 13 in the panel are formed on the upper and lower sides of the perforation and, in contrast, the empty spaces 30 of the cap 3 are formed in the upper and lower portions as though the notches 16 and the empty spaces are opposed to each other. The diagram is meant to illustrate that the empty spaces 30 are opposed to the engaging portions 14 of the insertion member 12. In the attachment of the cap 3, after the insertion member 12 has been thrust past the perforation 13, the engaging portions 14 are rotated by 90° as described above engaging portions 14 and consequently brought into a horizontal direction as illustrated in FIG. 14. The cap consequently changes its direction so that the empty spaces 30 are opposed respectively to the engaging portions 14 and the protuberances 29 formed on the walls 27 are made to correspond exactly with the upper and lower notches 16. Then, in that condition, the cap is pressed against the insertion member to bring the projections 28 into fast engagement with the engaging projections 15. This engagement completes the attachment of the cap.

When the cap 3 is fastened to the insertion member 12 as described above, the case 1 causes the panel 4 to be nipped between the contact flange 11 and the engaging portions 14. Once this attachment is obtained, the case cannot be pulled out of the perforation 13. Further, the engaging portions 14 which have been brought into fast engagement with the edges of the perforation in consequence of the rotation of the case are set into the empty spaces 30 in consequence of the attachment of the cap and, at the same time, the protuberances 29 of the cap are thrust into the notches 16 of the perforation. Thus, the engaging portions 14 are prevented from being rotated about its axis and moved to the notches 16. The case, therefore, cannot be withdrawn from the panel unless the cap is removed.

The lid locking device of the present invention is constructed as described above. After the attachment of the case 1 to the panel 4 is completed, the release wire 9 is connected to the case 1.

The release wire 9 is passed through the slit 17 formed in the periphery of the case and connected to the stopper 2 contained in the case as illustrated in FIG. 13. This connection is accomplished by first pushing the engaging head portion 20 of the stopper contained in the case against the energing force exerted by the spring 24, thrusting the rear end of the engaging head portion 20 into the hollow interior 7, aligning the forked connection member 21 with the enlarged portion 18 of the slit, then passing a globular engaging portion 31 formed at the terminal of the wire 9 through the enlarged portion 18, hooking the globular engaging portion 31 on the connection member 21, simultaneously passing the wire 9 through the slit 17 into the hollow interior 7, fitting the middle portion of the entire length of the wire in the groove of the stationary base 10 and laying the wire along the axis of the case. Thereafter the stopper which has been pushed in as described above is released from the pressure. As the stopper is moved toward the receiving room 6 by the energizing force of the spring 24, the engaging portion 31 of the wire 9 is simultaneously drawn in and the groove of the connection member 21 which has received the wire is closed with the wall of the receiving room 6. Thus, the wire is securely connected.

As is widely known, this wire 9 is remotely operated in the driver's seat. When the wire is drawn, the stopper causes the engaging head portion 20 thereof to be moved back into the case against the energizing force of the spring 24, with the result that the hook 19 provided on the lid is released. As the wire is released from the pull, the engaging head portion is automatically pushed out of the case. When the hook 19 is brought into contact with the engaging head portion in consequence of the closure of the lid, the engaging head portion is retracted by compressing the spring. Consequently, the hook 19 is brought into engagement with the engaging head portion.

The present invention has been described with reference to the accompanying drawing. The case 1, the stopper 2, and the cap 3 described above are separately formed with a thermoplastic synthetic resin. The lid locking device is attached to the panel 4 by the procedure described above. Then the wire 9 is connected thereto. As is clear from the description given above, the assemblage of this lid locking device can be accomplished simply by driving the stopper into the case. Then the attachment of the combination of the stopper and the case to the panel is effected by thrusting the insertion member 12 into the perforation 13, then rotating the insertion member 12 around its axis, and thereafter fastening the cap to the insertion member. The connection of the release wire 9 is effected by passing the engaging portion 31 at the terminal of the wire through the slit 17 with the stopper retained within the case and hooking the engaging portion 31 on the connection member 21 at the rear end of the stopper. Thus, the assemblage of the lid locking device and the attachment thereof to the panel can be performed very easily and quickly. Moreover, the fastening of the cap can enhance the stability of the attachment of the locking device to the panel. The removal of this cap permits desired removal of the lid locking device from the panel. When the wire requires replacement, the connection of the wire to the stopper can easily be broken by pushing in the stopper and bringing the connection member into alignment with the enlarged portion of the slit.

The cap, when set in position, conceals the opening of the case and causes the outwardly diverged contact flange 11 to seal tightly the perforation 16 of the panel. Even when the lid locking device of this invention is used at the fuel inlet to the gasoline tank in the automobile, for example, it prevents passage of overflowing gasoline and serves advantageously from the standpoint of safety.

In the embodiment described above, a portion of the case 1 has a cross section of the shape of a regular hexagon. This particular cross section permits ease use of tools such as wrenches and consequently facilitates the work of attachment of the device to the perforation in the panel.

What is claimed is:

1. A lid locking device comprising a cylindrical case having an opening at one end thereof, a stopper slidably contained in the hollow interior of said case and normally energized with a compressed spring and consequently enabled to keep an engaging head portion at the leading end thereof protruding from the opening of said case, a panel for permitting attachment of said case thereto, and a cap for covering the opening side end of said case, said stopper being provided at the rear end portion thereof with a connection member permitting connection thereto of a release wire passed through the rear end side of said case and adapted to impart a rearward motion to said engaging head portion upon application thereto of a pull, said case being provided with a contact flange outwardly diverged from the outer peripheral surface of the case surrounding the opening, a cylindrical insertion member extended axially from the peripheral edge of the case around the opening, and engaging portions formed around the peripheral surface of said engaging member and opposed to said contact flange, said panel being provided with a circular perforation containing along the edge thereof notches for permitting passage of said engaging portions, said perforation enabling said insertion member to be inserted therethrough and said contact flange to be brought into contact with one side of said panel and further enabling the insertion member inserted past the panel to be rotated around the axis thereof and consequently enabling the engaging portions passed through the notches to be brought into engagement with the opposite sides of the panel thereby causing the panel to be nipped between said engaging portions and said contact flange, said cap being provided with a window for permitting passage therethrough of the engaging head portion of said stopper, projections for engagement with engaging projections formed on the outer peripheral surface of the insertion member of said case, and protuberances for engagement with said notches formed in the panel, whereby the engagement between said engaging projections and said projections will fasten said cap to the insertion member of the case from the opposite side of the panel and consequently prevent the case from being rotated relative to the panel and secure the case to the panel.

* * * * *